(No Model.)

J. S. HUGHES.
TREE PROTECTOR AND LAWN ORNAMENT.

No. 313,424. Patented Mar. 3, 1885.

WITNESSES:
Robert Kirk
C. H. Jones

INVENTOR:
Jasper S Hughes
By J. S. ——
Attorney.

UNITED STATES PATENT OFFICE.

JASPER S. HUGHES, OF DAYTON, OHIO.

TREE-PROTECTOR AND LAWN ORNAMENT.

SPECIFICATION forming part of Letters Patent No. 313,424, dated March 3, 1885.

Application filed December 31, 1883. (No model.)

*To all whom it may concern:*

Be it known that I, JASPER S. HUGHES, of Dayton, in the county of Montgomery and State of Ohio, have invented a new and useful Improvement in Tree-Protectors and Lawn Ornaments, which improvement is fully set forth in the following specification and accompanying drawings, in which—

Figure 1:
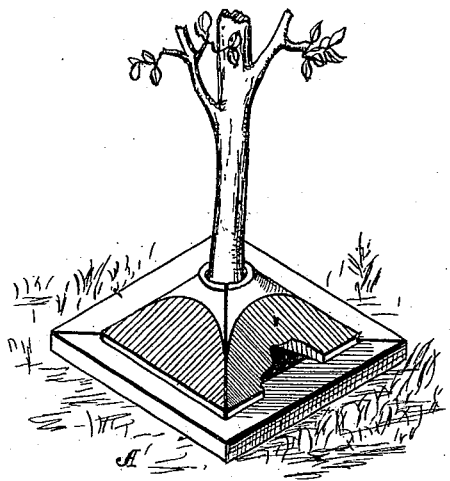
Figure 2:
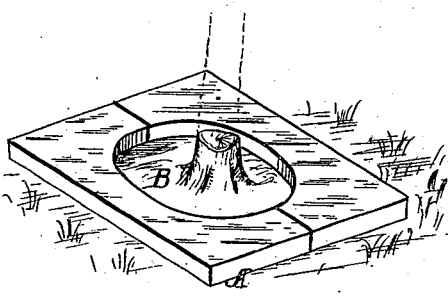
Figure 3:
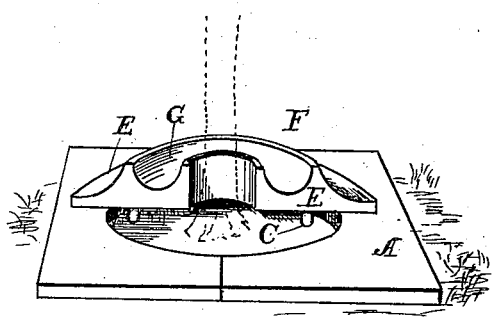
Figure 4:
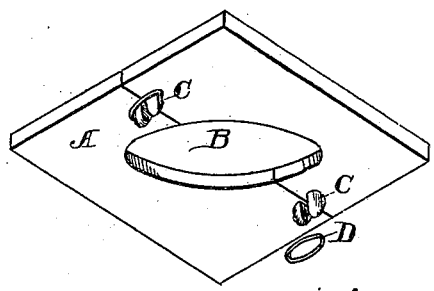

Figure 1 is a perspective view of a tree-protector in position at the base of a tree. Fig. 2 is a view of the base-piece. Fig. 3 is a modified form of the protector; and Fig. 4 is a view of the under side of the base, showing the manner of securing the sections together.

The object of the present invention is to produce a sectional tree-protector capable of ready application about the tree, and provided with peculiarly-constructed means for securing its several parts together.

The device can be made ornamental and arranged so as to exclude insects, therefore subserving the fourfold purpose of affording protection against lawn-mowers, keeping the earth in uniform state, in serving as a lawn ornament, and as a protection against insects.

To this end it consists in providing a disk or rim made preferably in two sections, provided centrally with an opening, so that the two sections may be laid upon the ground around the base of the tree. These sections are held together by means of wire loops secured to adjacent lugs or studs on the under side of the sections, or by means of wires tied around the sections. In case it is desired to exclude all insects from approaching the tree, or to make the protector as ornamental as possible, two additional sections are placed on the base-sections, the former of which are provided with an annular groove, in which may be placed prepared cotton or other obnoxious matter, all of which will now be set forth in detail.

In the accompanying drawings, A represents the base-sections, having centrally the opening B. On adjacent edges on the under side are two lugs, C C, over which are placed and fastened wire or metal loops D, so that the two sections are secured together, as shown in the view of the under side, Fig. 4.

The method of uniting these sections in the above construction is as follows: The sections are placed about the trunk of the tree, and the wire or metal loops, which are sufficiently flexible for the purpose, are placed in turn over the adjacent lugs on each section and forced upon the lugs snug up to the section. The contact is so rigid that the parts are locked firmly together, and the loops will be held securely in place. These sections, when placed around the tree at the base thereof on the ground, prevent the approach of lawn-mowers to injure the bark or damage the tree. For the purpose of making the device ornamental, as well as still further increasing its usefulness by providing a receptacle for cotton or any obnoxious substance to insects, I provide two more sections of any suitable size, shape, or configuration, made preferably with a smaller central aperture than the base sections. These sections E E are also provided on their under side with lugs C, by means of which, and wire loops D, they may be fastened together. It is the design to place the sections E on the sections A around the tree, and as the aperture F is much smaller than the aperture B in the base, it is evident that the upper part will be near enough to the tree to present a good appearance and to permit the cotton or other preparation in the groove G to come in contact with the tree. It is obvious that these sections may be made in any desirable form or configuration without departing from the spirit of my invention.

I prefer to make the base-sections square, as shown in Figs. 1, 2, 3, and 4, as the lawn-mower can more readily cut up to the base.

What I claim is—

1. In a tree-protector and lawn ornament, two or more base-sections, constructed and united together, as described, and having a central aperture, combined with two or more upper sections, constructed and united as described, and having a central opening and an annular groove about it, substantially as described.

2. The combination, in a tree-protector, of two or more base-sections, two or more upper sections, each having depending lugs, and the metal locking-loops D, substantially as described.

In testimony that I claim the foregoing I have hereunto set my hand, this 14th day of November, 1883, in the presence of witnesses.

JASPER S. HUGHES.

Witnesses:
WM. HARTLEY PUGH,
J. S. ZERBE.